Patented Sept. 24, 1940

2,215,556

UNITED STATES PATENT OFFICE

2,215,556

OXIDATION OF LEUCO COMPOUNDS

Geoffrey Lord and George Reeves, Spondon, near Derby, England, assignors to Celanese Corporation of America, a corporation of Delaware No Drawing. Application March 22, 1938, Serial No. 197,408

19 Claims. (Cl. 8—34)

This invention relates to improvements in chemical conversions and is more particularly concerned with the conversion of leuco compounds into their oxidised form and especially the conversion of leuco compounds of anthraquinone derivatives into the anthraquinone derivatives themselves.

This application is a continuation-in-part of our application S. No. 163,440, filed September 26, 1937.

As is well known, amino and alkylamino and arylamino anthraquinones and amino-hydroxy and alkylamino-hydroxy and arylamino-hydroxy anthraquinones are frequently manufactured by the action of ammonia or of an alkylamine or arylamine upon a leuco oxy-anthraquinone or a leuco oxy-amino-anthraquinone followed by oxidation of the resulting leuco amino or substituted amino anthraquinone. The oxidation of the leuco compound may be effected by means of air though this process has the disadvantage that it frequently leaves a small amount of the leuco compound incompletely oxidised. The more usual method of oxidation is to use an oxidising agent, i. e. a compound capable of giving up oxygen, e. g. sodium perborate, sodium hypochlorite, sulphuric acid and manganese dioxide. These more powerful oxidising agents are capable of oxidising the leuco compound completely and readily, but on the other hand they are liable to damage the end product, which is a great disadvantage in the manufacture of dyestuffs of standard shade. All the above processes have this in common, that the leuco compound is converted to the dyestuff or completely oxidised body by the action of a body which is capable of giving up oxygen.

We have now discovered an entirely new process of converting into the corresponding oxidised bodies leuco compounds which require to lose hydrogen for such conversion, without having recourse to the use of an oxidising agent. According to the present invention the conversion of such leuco compounds to the corresponding oxidised bodies is effected by treating such leuco compounds with organic compounds which are capable of reacting as unsaturated organic compounds. In this way the hydrogen atoms are removed from the leuco compound without the formation of water which characterises all the previously known processes. In contradistinction to the oxidising agents previously mentioned, the substances used in accordance with the present invention are capable of giving a very smooth conversion of the leuco compound to the oxidised body without detriment to the latter.

The organic compounds capable of reacting as unsaturated organic compounds used in accordance with the present invention, hereinafter characterised as the "dehydrogenating" substances, may be of the most diverse character and substances falling into widely different classes have been found to give excellent results. The following are typical classes of dehydrogenating substances which may be employed:

(a) Ketones which are capable of being formulated in the enol form.

The simplest member of this class is acetone and this has been found to be of especial value. Other members are, for example, the homologues of acetone, aceto-acetic esters, $\beta$-keto-acids and pyrazolones, e. g., 1-phenyl-3-methyl-5-pyrazolone. Substances such as isatin and phthalimide may also be regarded as falling in this class for they each contain, either in the stable or in the pseudo form, the grouping —CO—NH— and are thus capable of being formulated in the form in which this grouping is present as —C(OH)=N—. This latter form, which may be regarded as the enol form, is the stable form in the case of isatin and the pseudo form in the case of phthalimide, and it is in this "enol" form that the substances apparently act as dehydrogenating substances.

(b) Alkylene oxides, e. g. ethylene oxide, propylene oxide and the higher homologues.

It is believed that it has not previously been recognised that alkylene oxides are capable of pseudomerisation but it is clear that this is the case from a consideration of the reaction products obtained by their use in the present invention. Thus in the case of ethylene oxide the reaction products contain ethyl alcohol so that it would appear that the ethylene oxide functions as if it were vinyl alcohol. Similarly, the use of propylene oxide results in the formation of both normal propyl alcohol and isopropyl alcohol so that apparently the propylene oxide functions as if it were a mixture of propenyl alcohol and isopropenyl alcohol, which latter is, of course, the enol form of acetone.

Also included in this class are the alkylene imines, e. g. ethylene imine, which have been found to function in the same way. The reaction products in the case of ethylene imine contain ethylamine.

(c) Aldehydes, e. g. acetaldehyde and benzaldehyde. These substances contain the grouping =C=O and apparently add on hydrogen to form the group =CHOH. Also included in this class are the aldehydic sugars, e. g. the aldohexoses such as glucose.

(d) Substances containing an ethylene linkage, e. g. cinnamic acid, limonene, pinene and ethylene itself. The examples specified include substances in which the ethylene linkage is present in an aliphatic compound, substances in which it is present in an aromatic compound, and in which it is present in an alicyclic ring. In limonene there are two ethylene linkages, one in the alicyclic ring and the other in an aliphatic side chain. Limonene and pinene occur in commercial turpentine oils and may be used in this form.

(e) Aromatic compounds, e. g. benzene, naphthalene and derivatives thereof.

(f) Heterocyclic compounds which are capable of being hydrogenated, e. g. pyridine.

(g) Organic compounds in which nitrogen is linked to another atom by more than one valency bond, e. g. azo compounds and nitriles. As examples, there may be mentioned methyl orange and acetonitrile.

It will be noted that all the above compounds contain a double bond or are capable of being formulated as a compound containing a double bond. In other words all these compounds are capable of reacting as unsaturated compounds. In the cases of aldehydes and ketones the double bond is in the carbonyl group >C=O which adds on hydrogen to form the group >CHOH.

Although a number of classes of dehydrogenating substances have been specified above, the invention is not limited to such classes of substances but includes the use of any organic compound which is capable of reacting as an unsaturated compound. However, it is preferable, for obvious reasons, that the dehydrogenating substance used should not itself be a dyestuff.

The invention is of most value in the conversion to the oxidised form of leuco amino anthraquinones and leuco substituted amino anthraquinones, including the oxy derivatives of these compounds. It may, however, be applied to the oxidation of leuco compounds of oxy anthraquinones themselves, including leuco quinizarin, and leuco compounds of other anthraquinone derivatives. The invention is of greatest importance in the production of the oxidised bodies in substance, but where the conditions of the conversion are appropriate the conversion of the leuco compound to the oxidised body may take place on textile fibres. For example, where the amino or amino-oxy or substituted amino or substituted amino-oxy anthraquinones are applied to textile goods in the vatted state or in the form of free leuco compounds, conversion to the oxidised body according to the invention may take place on textile fibres. Similarly, leuco compounds other than the leuco compounds of anthraquinone derivatives may, where the leuco compounds require to lose hydrogen for such conversion, be converted by means of the present invention, e. g. leuco compounds of the indigo, thioindigo and indophenol series. Moreover, where the conversion conditions are appropriate, leuco compounds of vat dyes generally, including leuco esters of vat dyes, may, where the conversion to oxidised form requires only the loss of hydrogen atoms, be converted into the oxidised state on textile fibres.

Where, in the conversion of leuco compounds of amino or amino-oxy anthraquinones to the oxidised conditions by treatment with ethylene oxide or other alkylene oxides, it is desired to minimise any tendency for the alkylene oxide to oxyalkylate the leuco anthraquinone compound, the actual time taken for effecting the reaction should be reduced as much as possible. Thus, for example, the leuco anthraquinone compound may be raised to the temperature and pressure at which the conversion is most rapidly effected before introducing the alkylene oxide into the reaction vessel.

Amino, amino-oxy and substituted amino and substituted amino-oxy anthraquinones are frequently prepared by the replacement, by amino or substituted amino groups, of hydroxy, amino or substituted amino groups in anthraquinone compounds, by treatment of the anthraquinone compounds in the leuco form with ammonia or suitable amines. The conversion into the oxidised form of the leuco compounds produced by such processes, by the process of the present invention, may in many cases be carried out continuously with the production of such leuco compounds.

Thus we have found that a number of the dehydrogenating substances are capable of being present with the leuco compounds under conditions such that amidation by ammonia or organic amines can take place without conversion of the leuco compound to the corresponding oxidised body. In consequence, the amidation of leuco hydroxy, amino, hydroxy-amino, substituted amino and hydroxy-substituted amino anthraquinones may be carried out in the presence of the dehydrogenating substances without detriment to the amidation process, and subsequently, in the same liquor, the resulting amidated leuco compounds may be converted to the corresponding oxidised bodies by a simple change of the conditions obtaining during the amidation process to the conditions necessary for carrying out the dehydrogenation process. For example, a number of the dehydrogenating substances specified above do not exhibit their dehydrogenating property until temperatures are reached which are well above those at which amidation of a leuco anthraquinone derivative can be carried out. In consequence, such substances can be present during the amidation of a leuco anthraquinone derivative and after the amidation is complete the liquor may be raised to the temperature necessary for the transformation of the leuco compound to the corresponding oxidised compound. Thus, for example, leuco anthraquinone compounds are not converted to the corresponding oxidised compounds by pinene at temperatures below about 90° C. whereas amidation of suitable leuco anthraquinone compounds can readily be carried out at temperatures below 90° C.

Leuco anthraquinone derivatives which can be amidated and converted to the oxidised form in this way are, for example, quinizarin, 1:4:5-trihydroxy anthraquinone, 1:4:5:8-tetrahydroxy anthraquinone, alizarin Bordeaux, 1-hydroxy-4-amino anthraquinone, diamino anthrarufin or diamino anthrachrysazin. The amidation may be effected, for example, by means of ammonia, alkylamines, e. g. methylamine and mono ethanolamine, or arylamines, e. g. aniline and the toluidines.

If desired, the initial leuco compound which is subjected to the amidation process may be produced in the self-same liquor by acting on the corresponding anthraquinone starting material with a suitable reducing agent, e. g. sodium hydrosulphite.

The following examples, in which the parts are by weight, illustrate the invention but are not to be regarded as limiting it in any way.

THE USE OF ETHYLENE OXIDE

Example 1

An autoclave is charged with 60 parts of leuco-1:4-diamino-anthraquinone (the product of reaction of ammonia on leuco quinizarin), 600 parts of methyl alcohol, and 13 parts of ethylene oxide. The autoclave is closed and kept at 150° C. for 4 hours. It is then cooled and the product, the 1:4-diamino-anthraquinone, filtered and washed with methyl alcohol. Ethyl alcohol may be characterized in the mother liquor by the usual chemical tests.

Example 2

An autoclave is charged with 60 parts of leuco-1:4-diamino-anthraquinone and 600 parts of methyl alcohol. The autoclave is closed and its temperature raised to 150° C. When this temperature is reached 8.75 parts of ethylene oxide are forced into the autoclave under pressure. The autoclave is then allowed to cool and the product filtered and washed with methyl alcohol. The product is 1:4-diamino-anthraquinone in an excellent state of purity.

Example 3

An autoclave is charged with 60 parts of leuco-1:4-di(methylamino)-anthraquinone, 600 parts of methyl alcohol, and 13 parts of ethylene oxide. The whole is heated at 110-120° C. for 8 hours, and the product, 1:4-di(methylamino)-anthraquinone, isolated as described in Example 1 above.

Example 4

An autoclave is charged with 60 parts of leuco-1:4-di(hydroxy-ethylamino)-anthraquinone, 420 parts of methyl alcohol, and 13 parts of ethylene oxide. The whole is heated at 110-120° C. for 8 hours, and the product, 1:4-di(hydroxy-ethyl-amino)-anthraquinone, isolated as before.

Example 5

Example 4 is repeated with the following mixture:—

64 parts leuco-1:4-di(hydroxy-ethylamino)-5-oxy-anthraquinone, 470 parts methyl alcohol, and 13 parts ethylene oxide. The product is 1:4-di(hydroxy-ethyl-amino)-5-oxy-anthraquinone.

Example 6

Example 4 is repeated with the following mixture:—

65 parts leuco-1:4-di(hydroxy-ethylamino)-5:8-dioxy-anthraquinone, 500 parts methyl alcohol, and 14 parts ethylene oxide. The product is 1:4-di(hydroxy-ethyl-amino)-5:8-dioxy-anthraquinone.

Example 7

An autoclave is charged with 40 parts of leuco-1:4-dioxy-anthraquinone (leuco quinizarin), 500 parts of methyl alcohol, 2 parts of caustic soda (to form a sodium compound with the leuco quinizarin), and 13 parts of ethylene oxide. The whole is heated for 8 hours at 150-160° C., and the product, quinizarin, worked up in the usual way.

THE USE OF PROPYLENE OXIDE

Example 8

An autoclave is charged with 60 parts of leuco-1:4-diamino anthraquinone (the product of reaction of ammonia on leuco quinizarin), 600 parts of methyl alcohol, and 17 parts of propylene oxide. The whole is maintained at 150-160° C. for 4 hours, cooled, filtered, the solid product washed with methyl alcohol and dried. The product is 1:4-diamino-anthraquinone. Both normal propyl alcohol and isopropyl alcohol may be isolated from the mother liquor.

Example 9

An autoclave is charged with 40 parts of leuco-1:4-dioxy-anthraquinone (leuco quinizarin), 400 parts of methyl alcohol, 2 parts of caustic soda (to form the sodium compound of leuco quinizarin), and 15 parts of propylene oxide. The whole is maintained at 150-160° C. for 8 hours, and the product, quinizarin, worked up in the usual way.

THE USE OF ETHYLENE-IMINE

Example 10

An autoclave is charged with 50 parts of leuco-1:4-dihydroxy-anthraquinone (leuco quinizarin), 500 parts of methyl alcohol, and 10 parts of ethylene-imine. The whole is kept at 150° C. for 8 hours, cooled, and the product isolated as usual. In this reaction ethylamine is formed in a small quantity by the reduction of the ethylene-imine, and combines with the leuco quinizarin with the result that the product is slightly darkened. Where, as in the following example, the product is itself a dyestuff, such slight contamination is of no importance.

Example 11

Example 10 is repeated with the following mixture:—

50 parts leuco-1:4-diamino-anthraquinone (the product of reaction of ammonia on leuco quinizarin), 500 parts of methyl alcohol, and 10 parts of ethylene-imine. The product is 1:4-diamino-anthraquinone.

THE USE OF GLUCOSE

Example 12

An autoclave is charged with 50 parts of leuco-1:4-diamino-anthraquinone (the product of reaction of ammonia on leuco quinizarin), 500 parts of methyl alcohol, and 50 parts of glucose. The whole is heated at 150° C. for 8 hours, and the product, 1:4-diamino-anthraquinone, isolated in the usual way.

Example 13

Example 12 is repeated with the following mixture:—

50 parts leuco-1:4-di(methylamino)-anthraquinone, 400 parts industrial alcohol, and 50 parts glucose. The product is 1:4-di(methylamino)-anthraquinone.

THE USE OF ACETALDEHYDE

Example 14

An autoclave is charged with 20 parts of leuco 1:4-diamino-anthraquinone, 200 parts of ethyl alcohol, 20 parts of acetaldehyde and 2.5 parts of soda ash, and the contents heated at 150° C. for 8 hours. The product is filtered off and washed with ethyl alcohol. It consists of 1:4-diamino-anthraquinone.

THE USE OF BENZALDEHYDE

Example 15

The process of Example 14 is repeated using, instead of the acetaldehyde, 25 parts of benzaldehyde. The product is again 1:4-diamino-anthraquinone.

The Use of Acetone

Example 16

An autoclave is charged with 20 parts of leuco-1:4-diamino-anthraquinone, 200 parts methyl alcohol, 20 parts of acetone and 2.5 parts of soda ash, and the contents are heated at 150° C. for 8 hours. The product is 1:4-diamino-anthraquinone.

Example 17

An autoclave is charged with 30 parts of the leuco compound of Caledon Jade Green, (Colour Index No. 1101), 600 parts of water, 100 parts of acetone and 2 parts of soda ash, and the contents are heated at 140° C. for 8 hours. The contents of the autoclave are then cooled and the Caledon Jade Green formed is filtered off.

The Use of Methyl Aceto-Acetate

Example 18

The process of Example 16 is repeated using, instead of acetone, 25 parts of methyl aceto-acetate. The product is again 1:4-diamino-anthraquinone.

The Use of Phenyl-Methyl-Pyrazolone

Example 19

An autoclave is charged with 20 parts of leuco-1:4-diamino-anthraquinone, 200 parts of methyl alcohol, 40 parts 1-phenyl-3-methyl-5-pyrazolone and 2.5 parts of soda ash and the contents are heated at 150° C. for 8 hours. The product is filtered and washed with methyl alcohol and consists of 1:4-diamino-anthraquinone.

The Use of Isatin

Example 20

An autoclave is charged with 50 parts of leuco-1:4-di(methylamino)-anthraquinone, 500 parts of industrial alcohol, and 50 parts of isatin. The whole is kept at 150° C. for 8 hours, and the product, 1:4 - di(methylamino) - anthraquinone, worked up in the usual way.

The Use of Phthalimide

Example 21

An autoclave is charged with 50 parts of leuco-1:4-di(methylamino)-anthraquinone, 500 parts of industrial alcohol, and 50 parts of phthalimide, and the whole heated for 8 hours at 150° C. The product, 1:4 - di(methylamino)-anthraquinone, is worked up in the usual way.

The Use of Cinnamic Acid

Example 22

An autoclave is charged with 50 parts of leuco-1:4-diamino-anthraquinone (the product of reaction of ammonia on leuco quinizarin), 500 parts of methyl alcohol, and 30 parts of cinnamic acid. The whole is kept at 150° C. for 8 hours, and the product, 1:4-diamino-anthraquinone, isolated in the usual manner.

Example 23

An autoclave is charged with 50 parts of leuco-1:4-di(methylamino)-anthraquinone, 500 parts of industrial alcohol, and 30 parts of cinnamic acid. The contents are kept at 150° C. for 8 hours. The product, 1:4-di(methylamino)-anthraquinone, is isolated in the usual way.

The Use of Pinene

Example 24

An autoclave is charged with 50 parts of leuco-1:4-di(methylamino)-anthraquinone, 400 parts of industrial alcohol, and 50 parts of American turpentine oil. The whole is heated at 150° C. for 8 hours, and the product, 1:4-di(methylamino)-anthraquinone, isolated.

Example 25

An autoclave is charged with 30 parts of the leuco derivative of Thioindigo Black, (Schultz, Farbstofftabellen, volume 2, page 207, (1932)), 450 parts of industrial alcohol, 150 parts of American turpentine oil and 2 parts of soda ash. The contents of the autoclave are then heated at 135–140° C. for 6 hours. On cooling and filtering, Thioindigo Black is isolated.

The Use of Ethylene

Example 26

An autoclave is charged with 20 parts of leuco-1:4 - di(methylamino)-anthraquinone and 400 parts of industrial alcohol saturated with ethylene, and the contents are heated at 150° C. for 8 hours. The product, 1:4-di(methylamino)-anthraquinone, is isolated.

The Use of Benzene

Example 27

An autoclave is charged with 25 parts of leuco 1:4-diamino-anthraquinone and 500 parts of benzene, and the contents are heated at 200° C. for 5 hours. After cooling, the benzene is removed by distillation and the 1:4-diamino-anthraquinone produced is isolated.

Example 28

An autoclave is charged with 25 parts of leuco 1:4-di(methylamino)-anthraquinone, 500 parts of benzene and 5 parts of soda ash, and the contents are heated at 200° C. for 5 hours. The product, 1:4-di(methylamino)-anthraquinone, is isolated.

Example 29

An autoclave is charged with 25 parts of leuco-1-methylamino-4-ethanolamino-anthraquinone and 500 parts of benzene, and the contents are heated at 200° C. for 12 hours. The product, 1-methylamino-4-ethanolamino-anthraquinone, is isolated as before.

Example 30

An autoclave is charged with 50 parts of Indigosol Purple AR (Schultz, Farbstofftabellen, supplementary volume (1934) page 109) and 500 parts of benzene, and the contents are heated at 200–210° C. for 5 hours. On cooling the reaction products, the unreduced indigoid colouring matter crystallises out.

The Use of Naphthalene

Example 31

An autoclave is charged with 25 parts of leuco-1:4-diamino-anthraquinone and 500 parts of naphthalene, and the contents are heated at 200° C. for 5 hours. The contents are then cooled, alcohol added, and the product, 1:4-diamino-anthraquinone, isolated.

The Use of Pyridine

Example 32

An autoclave is charged with 25 parts of leuco-1:4-diamino-anthraquinone and 500 parts of pyridine, and the contents are heated at 200° C. for 5 hours. The contents are then cooled, an excess of water added, and filtered. The product, 1:4-diamino-anthraquinone, is isolated.

THE USE OF ACETONITRILE

*Example 33*

An autoclave is charged with 25 parts of leuco-1:4-diamino-anthraquinone and 500 parts of acetonitrile, and the contents are heated at 200° C. for 5 hours. The contents are then poured into water and filtered. The product, 1:4-diamino-anthraquinone, is isolated.

COMBINED PROCESS OF AMIDATION AND CONVERSION FROM LEUCO TO OXIDISED FORM

*Example 34*

An autoclave is charged with 4 parts of leuco quinizarin, 40 parts of industrial alcohol, 6 parts of 20% methylamine solution and 3 parts of American turpentine oil. The autoclave is closed and heated at 80–90° C. for 6 hours, after which, the amidation being complete, the temperature is raised to and maintained at 150° C. for a further 8 hours. The contents of the autoclave are then cooled, the product filtered and washed.

CONVERSION OF LEUCO COMPOUND TO OXIDISED COMPOUND ON TEXTILE FIBRES

*Example 35*

Cotton fabric impregnated with leuco Hydron Blue G (Colour Index No. 971), is subjected to an atmosphere of ethylene oxide at 100° C. The leuco compound is readily converted to the corresponding oxidised compound.

Having described our invention, what we desire to secure by Letters Patent is:

1. Process for the conversion to oxidised form of leuco compounds which require to lose hydrogen for such conversion, which comprises heating such leuco compounds with aromatic hydrocarbons.

2. Process for the conversion to oxidised form of leuco compounds which require to lose hydrogen for such conversion, which comprises heating such leuco compounds with benzene in a closed vessel.

3. Process for the conversion to oxidised form of leuco compounds which require to lose hydrogen for such conversion, which comprises heating such leuco compounds with organic compounds which contain an ethylene linkage.

4. Process for the conversion to oxidised form of leuco compounds which require to lose hydrogen for such conversion, which comprises heating such leuco compounds with ethylene in a closed vessel.

5. Process for the conversion to oxidised form of leuco compounds which require to lose hydrogen for such conversion, which comprises heating such leuco compounds with alkylene oxides.

6. Process according to claim 5, wherein the leuco compound treated is a leuco-amino-anthraquinone and it is raised to the temperature and pressure necessary for conversion by means of the alkylene oxide prior to the addition of the alkylene oxide.

7. Process for the conversion to oxidised form of leuco compounds which require to lose hydrogen for such conversion, which comprises heating such leuco compounds with ethylene oxide in a closed vessel.

8. Process for the conversion to oxidised form of leuco compounds which require to lose hydrogen for such conversion and which are carried on textile materials, which comprises heating such textile materials with ethylene oxide.

9. Process for the conversion to oxidized form of a leuco compound which requires to lose hydrogen for such conversion, which comprises heating such leuco compound with an organic compound, said organic compound being capable of reacting as an unsaturated compound and of chemically combining with hydrogen, so as to produce said oxidized form in addition to a hydrogenation product of said organic compound.

10. Process for the conversion to oxidized form of a leuco compound which requires to lose hydrogen for such conversion, which comprises heating such leuco compound with an organic compound which is not a dyestuff, said organic compound being capable of reacting as an unsaturated compound and of chemically combining with hydrogen, so as to produce said oxidized form in addition to a hydrogenation product of said organic compound.

11. Process for the conversion of a leuco 1.4-diamino-derivative of anthraquinone into the parent unreduced form, which comprises heating the leuco compound with an organic compound, said organic compound being capable of reacting as an unsaturated compound and of chemically combining with hydrogen so as to produce said unreduced form in addition to a hydrogenation product of said organic compound.

12. Process for the conversion to oxidized form of a leuco compound which requires to lose hydrogen for such conversion and which is carried on a textile material, which comprises heating the textile material with an organic compound, said organic compound being capable of reacting as an unsaturated compound and of chemically combining with hydrogen, so as to produce said oxidized form in addition to a hydrogenation product of said organic compound.

13. Process for the conversion to oxidized form of a leuco compound which requires to lose hydrogen for such conversion and which is carried on a textile material, which comprises heating the textile material with an organic compound which is not a dyestuff, said organic compound being capable of reacting as an unsaturated compound and of chemically combining with hydrogen, so as to produce said oxidized form in addition to a hydrogenation product of said organic compound.

14. Process for the production of a 1:4-diamino derivative of anthraquinone, which comprises subjecting a leuco 1:4-dihydroxy anthraquinone to the action of an amidating agent in the presence of an organic compound which is capable of reacting as an unsaturated compound and of chemically combining with hydrogen, the temperature conditions of such amidation being such that substantially no dehydrogenation of any leuco compound present takes place, and thereafter altering the temperature conditions to conditions under which dehydrogenation of the amidated leuco compound is effected by the said organic compound so as to produce the 1:4-diamino derivative of anthraquinone in unreduced form and a hydrogenation product of said organic compound.

15. Process for the conversion to oxidized form of a leuco compound which requires to lose hydrogen for such conversion, which comprises heating the leuco compound with an organic compound, said organic compound being capable of reacting as a compound containing an ethylene linkage, so as to produce said oxidized form in addition to a hydrogenation product of said organic compound.

16. Process for the conversion to oxidized form of a leuco compound which requires to lose hydrogen for such conversion, which comprises heating the leuco compound with an organic compound in an anhydrous inert liquid medium, said organic compound being capable of reacting as an unsaturated compound and of chemically combining with hydrogen, so as to produce said oxidized form in addition to a hydrogenation product of said organic compound.

17. Process for the conversion to oxidized form of a leuco compound which requires to lose hydrogen for such conversion, which comprises heating the leuco compound with an organic compound in presence of methyl alcohol, said organic compound being capable of reacting as an unsaturated compound and of chemically combining with hydrogen, so as to produce said oxidized form in addititon to a hydrogenation product of said organic compound.

18. Process for the conversion to the oxidized form of a leuco anthraquinone derivative which requires to lose hydrogen for such conversion, which comprises heating such leuco compound with an organic compound, said organic compound being capable of reacting as an unsaturated compound and of chemically combining with hydrogen, so as to produce said oxidized form in addition to a hydrogenation product of said organic compound.

19. Process for the conversion to the oxidized form of a leuco compound which requires to lose hydrogen for such conversion, which comprises heating the leuco compound in the absence of a condensing agent with an organic compound, said organic compound being capable of reacting as an unsaturated compound and of chemically combining with hydrogen, so as to produce said oxidized form in addition to a hydrogenation product of said organic compound.

GEOFFREY LORD.
GEORGE REEVES.